US011409816B2

(12) United States Patent
Oyenan et al.

(10) Patent No.: US 11,409,816 B2
(45) Date of Patent: Aug. 9, 2022

(54) METHODS AND SYSTEMS FOR DETERMINING AN ACTION TO BE TAKEN IN RESPONSE TO A USER QUERY AS A FUNCTION OF PRE-QUERY CONTEXT INFORMATION

(71) Applicant: MOTOROLA SOLUTIONS, INC., Chicago, IL (US)

(72) Inventors: Walamitien H. Oyenan, Elk Grove Village, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 965 days.

(21) Appl. No.: 15/847,551

(22) Filed: Dec. 19, 2017

(65) Prior Publication Data
US 2019/0188328 A1 Jun. 20, 2019

(51) Int. Cl.
*G06F 16/22* (2019.01)
*G06F 16/9535* (2019.01)
(Continued)

(52) U.S. Cl.
CPC ......... *G06F 16/9535* (2019.01); *G06F 3/167* (2013.01); *G06F 16/9038* (2019.01); *G10L 2015/223* (2013.01); *G10L 2015/228* (2013.01)

(58) Field of Classification Search
CPC .. G06F 16/9535; G06F 3/167; G06F 16/9038; G06F 3/16; G10L 2015/20
(Continued)

(56) References Cited

U.S. PATENT DOCUMENTS

2012/0034904 A1 2/2012 LeBeau et al.
2013/0144616 A1 6/2013 Bangalore
(Continued)

FOREIGN PATENT DOCUMENTS

EP 2884409 6/2015
EP 3141987 3/2017
(Continued)

OTHER PUBLICATIONS

PCT/US2018/062108 International Search Report and Written Opinion of the International Searching Authority dated Feb. 14, 2019 (14 pages).

*Primary Examiner* — Hosain T Alam
*Assistant Examiner* — Tracy M McGhee
(74) *Attorney, Agent, or Firm* — Michael Best & Friedrich LLP

(57) ABSTRACT

Methods and systems for determining an action to be executed in response to a user query as a function of pre-query context information. One system includes an electronic computing device that includes a microphone, a transceiver, and an electronic processor. The electronic processor is configured to receive audio data from the microphone prior to receiving a user query, and determine, at predetermined time intervals, context information from the audio data. The electronic processor is further configured to store the context information in a memory. The electronic processor is further configured to receive second audio data from the microphone, and determine that the second audio data corresponds to the user query. The electronic processor is further configured to determine an action to be executed as a function of the second audio data and the context information, and execute the action in response to the user query.

18 Claims, 4 Drawing Sheets

(51) Int. Cl.
*G06F 16/9038* (2019.01)
*G06F 3/16* (2006.01)
*G10L 15/22* (2006.01)

(58) Field of Classification Search
USPC .......................................................... 707/722
See application file for complete search history.

(56) References Cited

U.S. PATENT DOCUMENTS

2015/0074524 A1* 3/2015 Nicholson ............... G06F 3/167
715/706
2017/0185375 A1* 6/2017 Martel ................ G06F 16/3329

FOREIGN PATENT DOCUMENTS

| WO | 2017112003 | 6/2017 |
| WO | 2018/056846 | 3/2018 |

* cited by examiner

METHODS AND SYSTEMS FOR DETERMINING AN ACTION TO BE TAKEN IN RESPONSE TO A USER QUERY AS A FUNCTION OF PRE-QUERY CONTEXT INFORMATION

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
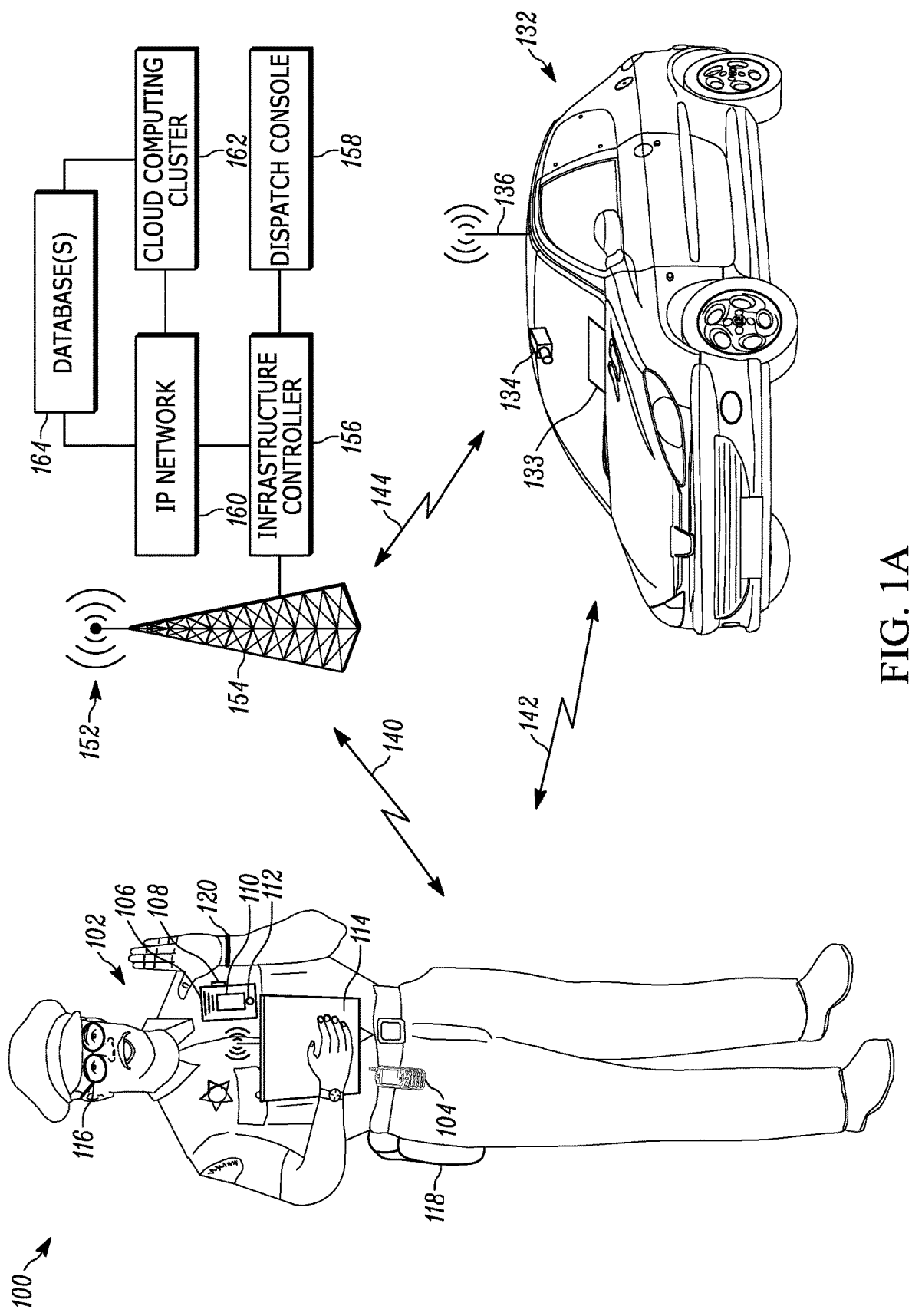
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices often comprise, or provide access to, electronic digital assistants (sometimes referenced as "virtual partners") that may provide the user thereof (such as a first responder) with valuable information. As one example, the electronic digital assistants of some communication devices are configured to receive a user query and execute an action in response to the user query. Often times, such communication devices recognize a user query by analyzing received audio data that corresponds to a keyword that allows the communication device to determine that a user query is about to be spoken by a user. For example, a user may verbally recite a name of the electronic digital assistant before verbally reciting the user query.

In some situations, audible information before the user query (for example, words spoken by the user or by another person) may be useful to help identify and/or execute a specific action that relates to the later-spoken user query. In other words, pre-query context information stored before a user query is received may be used to help the communication device properly respond to the user query. However, a technical problem exists with respect to storing this pre-query context information because communication devices (and other devices where this pre-query context information may be stored) often have limited memory that may make it difficult to store large amounts of audio data. Thus, some communication devices may only store audio data in response to recognizing that the user has spoken the keyword to trigger the electronic digital assistant. Other communication devices may only store a small amount of audio data (for example, ten seconds of audio data).

Disclosed are a method, device, and system for an electronic digital assistant to determine and store context information from received audio data prior to receiving a user query. In other words, the electronic digital assistant determines and stores pre-query context information. The electronic digital assistant then determines an action to be executed in response to the user query as a function of the pre-query context information. By periodically determining and storing pre-query context information from received audio data, the disclosed method, device, and system solve the technical problem related to limited memory by reducing the amount of memory necessary to store pre-query information and/or by allowing more pre-query information to be stored in the same amount of memory as other devices.

One embodiment provides an electronic computing device that includes a microphone, a transceiver, and an electronic processor communicatively coupled to the transceiver. The electronic processor is configured to receive audio data from the microphone prior to receiving a user query, and determine, at predetermined time intervals, context information from the audio data. The electronic processor is further configured to store the context information in a memory. The electronic processor is further configured to receive second audio data from the microphone, and determine that the second audio data corresponds to the user query. The electronic processor is further configured to determine an action to be executed as a function of the second audio data and the context information, and execute the action in response to the user query.

Another embodiment provides a method for determining an action to be executed in response to a user query as a function of pre-query context information. The method includes receiving audio data from a microphone of an electronic computing device prior to receiving the user query. The method further includes determining, with the electronic computing device, at predetermined time intervals, context information from the audio data. The method further includes storing, with the electronic computing device, the context information in a memory. The method further includes receiving second audio data from the microphone, and determining, with the electronic computing device, that the second audio data corresponds to the user query. The method further includes determining, with the electronic computing device, the action to be executed as a function of the second audio data and the context information. The method further includes executing, with the electronic computing device, the action in response to the user query.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
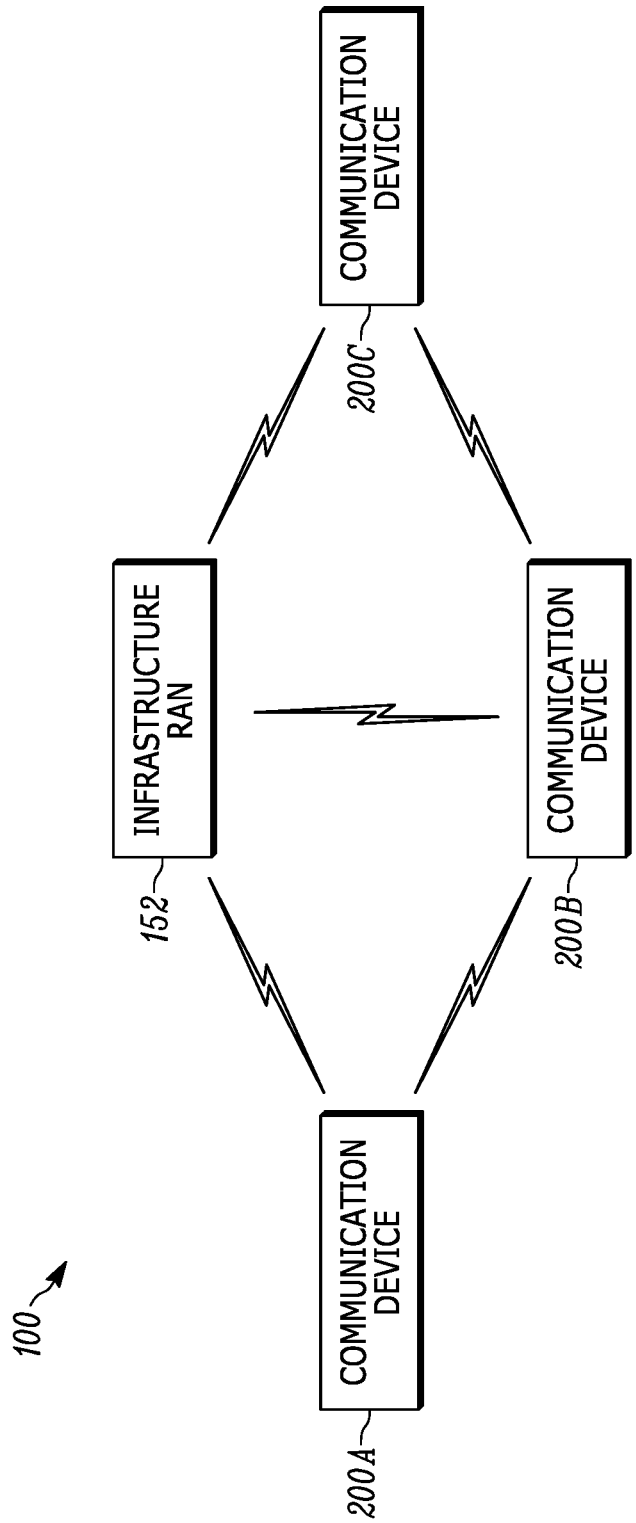

Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, pan/tilt/zoom (PTZ) capable cameras, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented.

Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1A.

b. Device Structure

Figure 2:
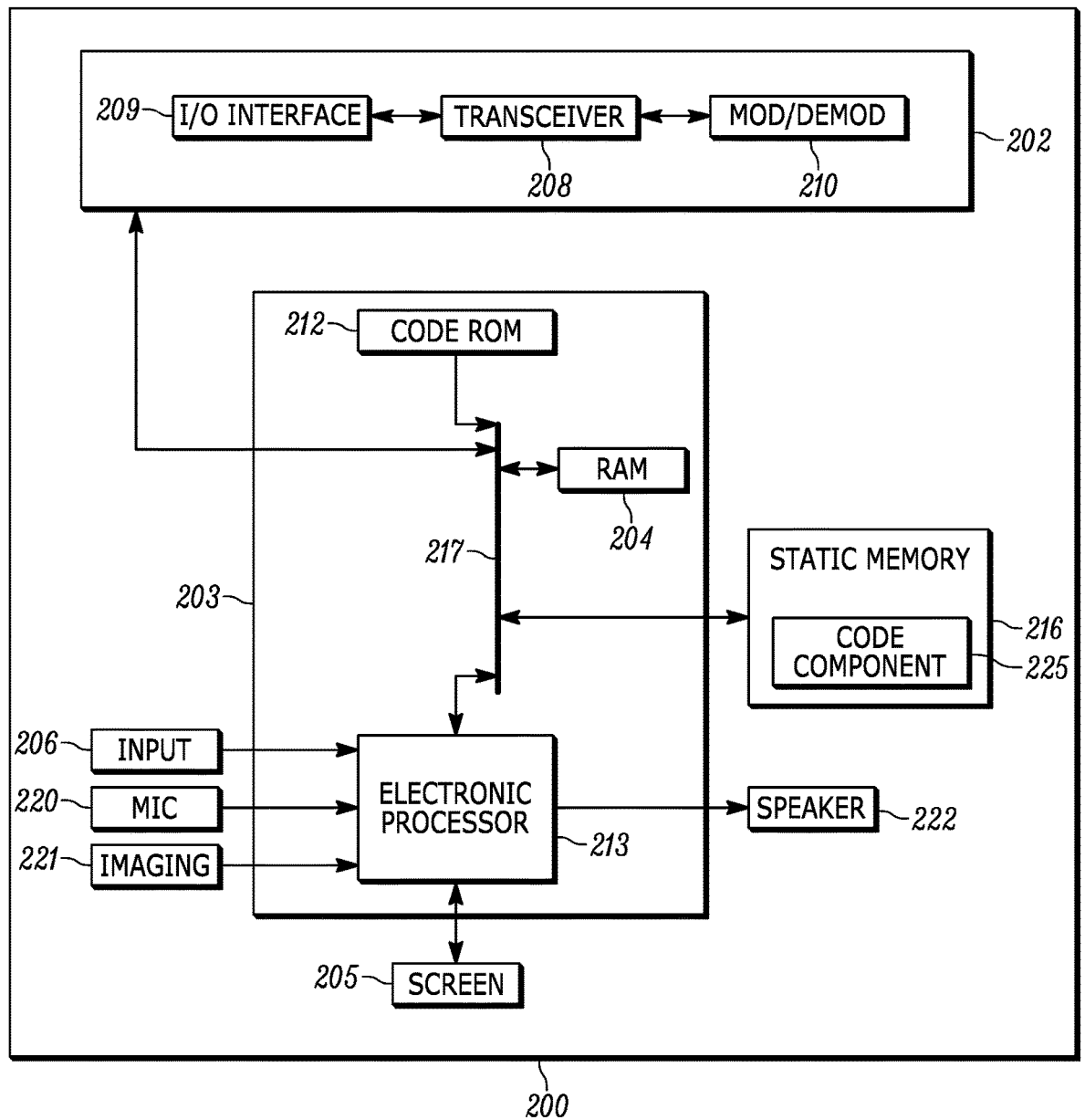
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text. In some embodiments, the static memory 216 may also store, permanently or temporarily, audio data received by the microphone 220, text data transcribed from the audio data, and context information determined from the audio data and/or text data as explained in greater detail below.

The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Determining an Action to be Executed in Response to a User Query as a Function of Pre-Query Context Information In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102 may, for example, provide an oral query that is received by the microphone 220 of the communication device 200. The electronic computing device receives signals representative of the oral query (in other words, audio data) from the microphone 220 and analyzes the signals to determine the content of the oral query. For example, the electronic computing device may include a natural language processing (NLP) engine configured to determine the intent and/or content of the oral query. The electronic computing device may also be configured to determine a response to the oral query (for example, by retrieving stored data or by requesting data from the database(s) 164 and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1A, such as the portable radio 104, the infrastructure controller 156, and/or cloud computing cluster 162 may include a natural language processing engine to analyze oral queries received by the microphone 220 of the communication device 200 and provide responses to the oral queries. In some embodiments, the natural language processing engine analyzes audio data and/or a text transcription of audio data.

Although an oral query is described above, in some embodiments, the electronic computing device receives and responds to other types of queries and inputs. For example, the user 102 may submit a text query to the electronic computing device by typing the text query into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video.

As mentioned above, in some situations, audible information received by the microphone 220 before a user query (for example, words spoken by the user or by another person) may be useful to help identify and/or execute a specific action that relates to the later-spoken user query. However, a technical problem exists with respect to storing pre-query information because communication devices (and other devices where pre-query information may be stored) often have limited memory, which makes it difficult to store large amounts of audio data. Thus, some communication devices only store audio data in response to recognizing that the user has spoken a keyword to trigger the electronic digital assistant. Other communication devices only store a small amount of audio data (for example, ten seconds of audio data).

Figure 3:
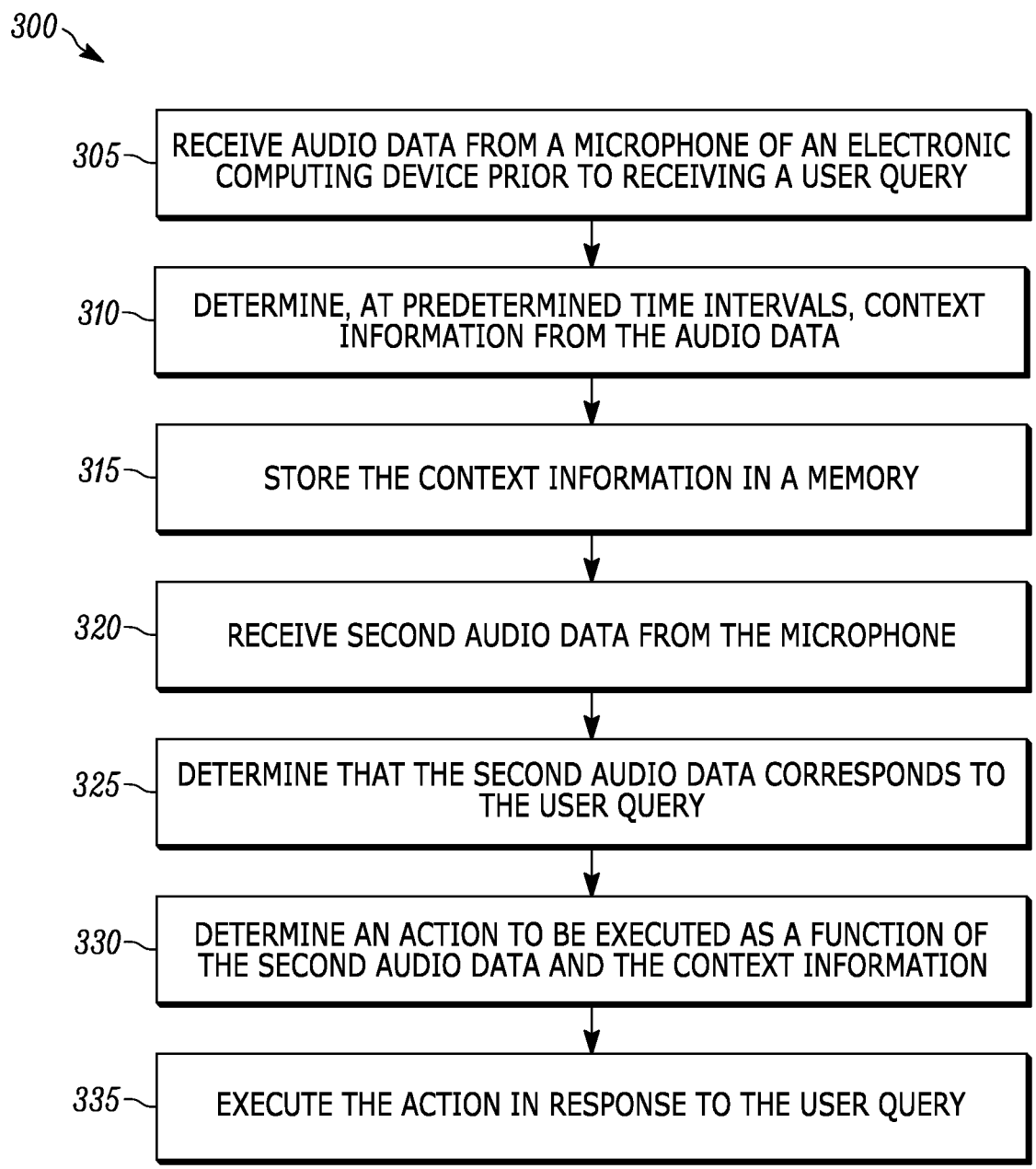
FIG. 3 illustrates a flow chart of a method of determining an action to be executed in response to a user query as a function of pre-query context information in accordance with some embodiments.

To solve this technical problem by reducing the amount of memory necessary to store pre-query information and/or by allowing more pre-query information to be stored in the same amount of memory as other devices, the electronic computing device that implements the electronic digital assistant performs, in one instance, a method 300 illustrated in FIG. 3. The method 300 is executed by the electronic computing device to determine an action to be executed in response to a user query as a function of pre-query context information. In performing the method, the electronic computing device determines and stores context information from received audio data prior to receiving a user query as explained in greater detail below.

FIG. 3 illustrates a flow chart diagram of the method 300 performed by the electronic computing device for determining an action to be executed in response to a user query as a function of pre-query context information. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic computing device receives audio data from the microphone 220 prior to receiving a user query. In some embodiments, the microphone 220 records audio when the user 102 has not explicitly prompted the electronic digital assistant. For example, the microphone 220 records audio from a conversation between a first responder and suspect prior to the first responder prompting the electronic digital assistant or affirmatively starting an audio recording process (for example, by using a verbal command or by pressing a hard or soft key/button). In some embodiments, the electronic computing device stores audio data generated by the microphone 220 prior to receiving a user query in a memory of the electronic computing device (for example, the static memory 216). In some embodiments, the portable communication device 200 transmits audio data to another communication device 200 for storage and/or analysis and later retrieval. For example, the memory where audio data is stored is located on a portable communication device 200 (for example, the portable radio 104) where the microphone 220 is located, a back-end device in the cloud computing cluster 162, the infrastructure controller 156, or other communication devices. In some embodiments, the portable communication device 200 transmits audio data and/or other stored data explained below to the cloud computing cluster 162 upon the portable communication device 200 being docked, for example, on a charging station. In some embodiments, the electronic computing device stores the audio data in a circular buffer of the memory such that more recent audio data overwrites less recent audio data when the circular buffer is full. However, as mentioned above, the size of the memory, and therefore the size of the circular buffer, may be limited in some situations. For example, the circular buffer may only be capable of storing a limited amount of audio data (for example, ten seconds of audio data).

At block 310, the electronic computing device determines, at predetermined time intervals, context information from the audio data. At block 315, the electronic computing device stores the context information in the memory. In some embodiments, context information is a type of information that is likely to be useful to populate information in a future user query. For example, context information may be the name of a person or event, a location, keywords corresponding to public safety incidents (for example, kidnapping, robbery, arson, and the like), and any other words that may be relevant to a future query.

In some embodiments, to determine the context information from the audio data (at block 310), the electronic computing device performs text transcription of the audio data to generate text corresponding to the audio data. The electronic computing device then stores the text corresponding to the audio data in the memory in a similar manner as described above with respect to storing the audio data. In some embodiments, storing text data uses less space of the memory than storing audio data. In some embodiments, the electronic computing device performs natural language processing on the text data to determine the context information. For example, the electronic computing device compares words within the text to a list of example words that are categorized as context information stored in the database(s) 164. The electronic computing device stores the words recognized as context information in the memory and discards unrecognized words to free up additional space in the memory. Accordingly, the electronic computing device reduces the amount of memory used to store pre-query information by performing text transcription of audio data and by analyzing the text to extract context information while discarding the remaining text. In other embodiments, the electronic computing device stores context information in the memory and does not discard the remaining text because, as mentioned above, storing text data uses less space of the memory than storing audio data. Accordingly, in some situations, the memory of the electronic computing device is large enough such that all text data generated, for example, during a shift of a first responder, may be able to be stored.

In some embodiments, the electronic computing device recognizes context information in other manners. For example, the electronic computing device extracts the context information from the audio data by directly analyzing the audio data.

In some embodiments, the context information is stored in a second circular buffer such that more recent context information overwrites less recent context information when the second circular buffer is full. In other embodiments, the size of the memory allows context information to be stored for the duration of a work shift of a first responder at which time the context information may be uploaded or downloaded to another device for more permanent storage. In other embodiments, the memory is overwritten one or more times during the work shift of a first responder. In such embodiments, the electronic computing device periodically uploads or downloads the context information to another device for permanent storage before the stored context information is overwritten.

In some embodiments, the electronic computing device updates the database(s) 164 of context information based on previous user queries to allow similar information to be recognized as context information in the future. For example, when a user query inquires about the weather at Central Park at a certain time of day in the past, the electronic computing device stores the words "Central Park" in the database(s) 164 if those words were not previously stored in the database(s) 164.

In some embodiments, the electronic computing device categorizes the context information based on at least one of the group consisting of an incident type, a location (for example, global positioning system coordinates, an address, a premises with a history of public safety incidents), a time of day, and a name of a person involved in a communication. Continuing the Central Park example above, the electronic computing device recognizes that Central Park is a location based on previous user queries. Accordingly, the electronic computing device stores the category of the word or set of words in the memory (for example, "location") along with the word or set of words (for example, "Central Park"). Such categorization of the context information allows the electronic computing device to populate information in a future user query faster and more accurately by only analyzing context information in a category for which information is unknown as explained in greater detail below with respect to block 330. In some embodiments, the example words or sets of words categorized as context information and stored in the database(s) 164 are similarly categorized into at least one of the groups mentioned above.

In some embodiments, the electronic computing device categorizes the context information as incident context information based on an incident during which the context information was determined. For example, over the course of a work shift, a first responder may encounter different people and handle different incidents. The electronic computing device identifies different incidents based on, for example, location of a communication device 200 of the first responder or monitored communication between the first responder and other people. The electronic computing device then categorizes stored context information based on the identified incidents. For example, the electronic computing device may store all context information that was determined from audio data at a first location as first incident context information. When the first responder travels to a second location to handle a second incident, the electronic computing device may store all context information that was determined from the audio data at the second location as second incident context information. Categorizing the context information on an incident-specific basis to create incident context information for each incident may allow the electronic computing device to populate information in a future user query faster and more accurately by only analyzing context information corresponding to the incident as explained in greater detail below with respect to block 330. Similar to the above categorization of context information based on incidents, in some embodiments, the electronic computing device categorizes stored context information based on the location of the communication device 200 when the context information was determined and/or based on the time at which the context information was determined. When the electronic computing device stores incident context information for each incident or stores context information based on time and/or location, the stored context information may be referred to as a context history of the first responder.

As noted above, at block 310, the electronic computing device determines the context information from the audio data at predetermined time intervals. In other words, in some situations, the electronic computing device determines context information from the audio data when a user query has not yet been received. In some embodiments, the electronic computing device determines the context information from the audio data at predetermined time intervals as a function of the size of the circular buffer that stores audio data. In other words, when the circular buffer is configured to store thirty seconds of audio data, the electronic computing device determines context information every thirty seconds or every twenty-five seconds. Similarly, in some embodiments, the electronic computing device determines the context information from the audio data at predetermined time intervals as a function of the size of the memory that stores context information. In some embodiments, the electronic computing device determines context information every five seconds to attempt to ensure that recent context information is available in the event a user query is received. In some embodiments, the electronic computing device determines the predetermined time interval based on whether there is new audio data or transcribed text data in the memory. For example, the electronic computing device may not perform natural language processing to determine context information at predetermined time intervals unless new (in other words, unprocessed) audio data or transcribed text data is present in the memory.

By using a circular buffer to store audio data and a second circular buffer to store context information extracted from the audio data, the electronic computing device is able to store pre-query information of a greater temporal range than a device that merely uses a single circular buffer to store audio data. Additionally, by determining context information from audio data at predetermined time intervals, the electronic computing device is able to store more pre-query information in the same or less memory than existing designs that wait to analyze stored audio data until a user query is received. Thus, by executing the method 300, the electronic computing device solves a technical problem of limited memory that may make it difficult to store large amount of pre-query audio data.

At block 320, the electronic computing device receives second audio data from the microphone 220, and at block 325, the electronic computing device determines that the second audio data corresponds to a user query. For example, the electronic computing device may include a natural language processing engine, as explained above, that is configured to determine that the second audio data and/or text data transcribed from the second audio data corresponds to a user query. For example, the electronic computing device determines that a keyword has been verbally recited to trigger the electronic digital assistant and to indicate that the following oral information corresponds to the oral query. In other words, the user may activate the electronic digital assistant to listen for the oral query by verbally reciting a keyword such as the name of the electronic digital assistant.

At block 330, the electronic computing device determines an action to be executed as a function of the second audio data (in other words, the user query) and the context information. In some embodiments, to determine the action to be executed, the electronic computing device determines a query intent and query slot information based at least partially on the user query. In some embodiments, the query intent is a general action to be executed by the electronic computing device and includes at least one query slot that includes query slot information that specifies details of the general action to be taken. For example, a query intent may be retrieving information and providing the information to an output device of a communication device 200. As another example, a query intent may be transmitting information to a communication device 200 of another user. Continuing these examples, query slot information may indicate details about the information to be retrieved and provided or the information to be transmitted, or may indicate an intended recipient of the information to be transmitted. As a more specific example, a user query may request a criminal record of a suspect named John Smith. In this example, the query intent is the action of retrieving information and providing the retrieved information to the user via an output device. The query intent has two query slots that include query slot information that specifies that the information to be retrieved is 1) the criminal record of 2) John Smith. In some embodiments, a user query has more than one query intent and/or more than one query slot within a query intent.

In some embodiments, the electronic computing device determines at least one of a query intent and query slot information of a user query using the second audio data (for example, using the natural language processing engine to analyze audio data or a text transcription of audio data as explained above). In other words, the electronic computing device uses information from the user query itself to determine at least one of a query intent and query slot information.

In some embodiments, the electronic computing device additionally determines at least one of a query intent and query slot information of the user query using the context information previously stored in the memory at block 315. For example, when a first responder begins communicating with a suspect, the electronic computing device receives audio data from the microphone 220 that corresponds to a conversation between the first responder and the suspect (at block 305). The electronic computing device recognizes that the suspect responded by saying, for example, "John Smith" when the first responder asked him his name. The electronic computing device also determines that these words are context information because they correspond to a name of a person (at block 310). Accordingly, the electronic computing device stores the words "John Smith" in the memory as context information (at block 315). In some embodiments, the electronic computing device also categorizes the words "John Smith" in the memory as the name of a person. After communicating with the suspect, the first responder may instruct the electronic computing device to "perform a criminal record check." However, this user query does not include information on whom the criminal record check is to be performed. In other words, the electronic computing device is able to determine the query intent and query slot information for one query slot based on information included in the user query but is unable to determine query slot information of another query slot based on the user query alone. In this situation, the electronic computing device uses the context information (in other words, stored pre-query information) to fill the unknown query slot information. In other words, the electronic computing device determines that the action to be executed is a criminal record check on John Smith.

In some embodiments, based on the user query, the electronic computing device determines a category of information of at least one of a query intent and query slot information (for example, using the natural language processing engine to analyze audio data or a text transcription of audio data as explained above). In such embodiments, the electronic computing device determines at least one of a query intent and query slot information using stored context information corresponding to the determined category of information. Continuing the example from above, based on the query intent and the known query slot information, the electronic computing device determines that the unknown query slot information is the name of a person. Thus, the electronic computing device limits its analysis of stored pre-query context information to context information that is categorized as being the name of a person. As mentioned above, limiting the amount of context information analyzed by the electronic computing device allows the electronic computing device to populate unknown query intents and/or query slot information faster and more accurately.

Similarly, in some embodiments, the electronic computing device determines that a user query relates to an incident for which context information was previously stored (for example, using the natural language processing engine to analyze audio data or a text transcription of audio data as explained above). In such embodiments, the electronic computing device determines at least one of a query intent and query slot information using stored incident context information corresponding to the incident. In other words, the electronic computing device may limit its analysis of stored pre-query context information to context information that is categorized as being related to the incident corresponding to the user query. For example, when a first responder asks the electronic computing device to "perform a criminal record check on the carjacking suspect that I questioned today," the electronic computing device only analyzes stored context information that has been categorized as relating to the carjacking incident. As mentioned above, limiting the amount of context information analyzed by the electronic computing device may allow the electronic computing device to be faster and more accurate when populating unknown query intents and/or query slot information. Additionally, in some embodiments, stored incident context information categorized as relating to an incident may be used to pre-populate an incident report for the incident. In some embodiments, the categorization of the context information to distinguish different context information from different incidents prevents context information from one incident from being used in the incident report of a different incident.

At block 335, the electronic computing device executes the action (determined at block 330) in response to the user query. The electronic computing device may execute the action in accordance with the query intent and the query slot information determined at block 330 in some embodiments.

In some embodiments, the action executed by the electronic computing device is providing a query result with an output device of a communication device 200 of the user 102. For example, the electronic computing device may display the criminal record of a suspect on the screen 205 of the laptop 114 of a first responder in response to the user query inquiring about the criminal record of the suspect. As another example, the electronic computing device outputs the criminal record of the suspect on the speaker 222 in an audio file or message. In some embodiments, the electronic computing device selects an output device on which to provide the query result based on at least one of information included in the query result and an environment in which the communication device 200 is located. For example, when information included in the query result is sensitive or classified, the electronic computing device provides a notification on the output device of the communication device 200 to indicate that the query result is available. The electronic computing device may then output the query result on the output device in response to a user input. Such functionality allows the user to move to a private area before the electronic computing device outputs the query result including the sensitive or classified information. Similarly, one or more sensors of the communication device 200 may indicate an environment in which the communication device 200 is located. For example, a sensor may indicate that the user is in a public area. In such situations, the electronic computing device may similarly provide a notification on the output device that the query result is available and may wait to output the query result until a user input is received indicating that the query result should be output.

In some embodiments, the electronic computing device generates multiple query results in response to the user query. Continuing the previous example relating to providing the criminal record of the suspect, the criminal record may include multiple past incidents of criminal activity (for example, a kidnapping, two robberies, and a stolen vehicle charge). In such a situation, the electronic computing device prioritizes the query results as a function of the context information. For example, the pre-query context information may indicate that the first responder was communicating with the suspect about a vehicle of which the suspect was suspiciously looking in the windows. Using this context information, the electronic computing device provides information relating to the stolen vehicle charge first because the stolen vehicle charge is more similar to the pre-query context information than the other past incidents of criminal activity in the criminal record of the suspect. In some embodiments, the electronic computing device identifies similar incidents and prioritizes query results by comparing words stored as pre-query context information with words used to describe a past incident in an incident report.

In some embodiments, the action executed by the electronic computing device is transmitting, via the transceiver 208, information to a second communication device 200 of a second user. For example, the electronic computing device transmits a request for backup at a location in response to the user query instructing the electronic computing device to request backup at the location.

In some embodiments, the action executed by the electronic computing device is storing information in the memory. For example, the electronic computing device stores verbally dictated observations of a first responder in response to the user query requesting that the observations be stored for later use. In some embodiments, these verbally dictated observations are stored in an area of the memory different than the circular buffer described above such that the entirety of the verbally dictated observations are saved for later use. For example, the electronic computing device may not discard any data as irrelevant when the electronic computing device has been explicitly instructed to store the verbally dictated observations. In some embodiments, the electronic computing device transcribes the verbally dictated observations into text for storage in the memory. As described above, such text transcription may save memory space in comparison to storing audio data.

In some embodiments, the electronic computing device provides a confirmation request with an output device (for example, the screen 205 or the speaker 222) of the communication device 200 of the user 102 before executing the action in response to the user query (at block 335). Returning to the example where the electronic computing device populates the name "John Smith" as query slot information using the context information, the electronic computing device provides a confirmation request on an output device of the communication device 200 to allow the first responder to confirm that the electronic computing device has populated the previously unknown query slot information with the desired pre-query context information. The electronic computing device then executes the action in response to receiving, via an input device, an input indicating a confirmation that the determined action should be executed. For example, the electronic computing device receives a verbal confirmation from the first responder via the microphone 220 or receives a confirmation via a hard keyboard input device or a soft keyboard input provided on the screen 205.

In some embodiments, the electronic computing device transmits at least part of the context information stored in the memory to a communication device 200 of another user. Reciprocally, the electronic computing device may also receive information from a communication device 200 of another user and store the received information in the memory as part of the context information. Such communication of context information between communication devices 200 of different users allows the electronic computing device to store additional context information that may be useful to determine query intent or query slot information when a user query is received as described above. For example, context information is shared between communication devices 200 of first responders handling the same incident or first responders within a predetermined distance of each other. As another example, context information is shared between communication devices 200 of first responders who have handled similar incidents within a predetermined time of each other or who have been located at the approximately same location within a predetermined time of each other. Although context information is described above as being shared between communication devices 200 of different users, in some embodiments, audio data or text data transcribed from the audio data may be shared between communication devices 200 of different users. In such embodiments, each communication device 200 may determine context information from the received audio data or text data in a similar manner as described with respect to block 310.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
   a microphone;
   a transceiver; and
   an electronic processor communicatively coupled to the transceiver, the electronic processor configured to
      receive audio data from the microphone prior to receiving a user query,
      store the audio data in a circular buffer,
      determine, at predetermined time intervals as a function of a size of the circular buffer, context information from the audio data, wherein the context information is determined before receiving second audio data that corresponds to the user query,
      store the context information in a memory,
      receive the second audio data from the microphone,
      determine that the second audio data corresponds to the user query,
      determine an action to be executed as a function of the second audio data and the context information, and
      execute the action in response to the user query;
   wherein the electronic processor is further configured to
      categorize the context information as public safety incident context information based on a public safety incident during which the context information was determined,
      determine that the user query relates to the public safety incident, and
      determine at least one of a query intent and query slot information using the public safety incident context information corresponding to the public safety incident.

2. The electronic computing device of claim 1, wherein the electronic processor is further configured to:
   execute the action in accordance with the query intent and the query slot information.

3. The electronic computing device of claim 1, wherein the electronic processor is further configured to:
   generate query results in response to the user query; and
   prioritize the query results as a function of the context information.

4. The electronic computing device of claim 1, wherein the electronic processor is further configured to:

perform text transcription of the audio data to generate text corresponding to the audio data;
store the text corresponding to the audio data in the memory; and
perform natural language processing on the text to determine the context information.

5. The electronic computing device of claim 1, wherein the electronic processor is further configured to:
categorize the context information based on at least one of the group consisting of an incident type, a location, a time of day, and a name of a person involved in a communication;
determine a category of information of the at least one of the query intent and the query slot information of the user query; and
determine the at least one of the query intent and the query slot information using the context information, wherein the context information corresponds to the determined category of information.

6. The electronic computing device of claim 1, wherein the action executed by the electronic processor includes at least one of the group consisting of providing a query result with an output device of a communication device of a user, transmitting, via the transceiver, information to a second communication device of a second user, and storing information in the memory.

7. The electronic computing device of claim 1, wherein the memory is located on at least one of a portable communication device and a back-end device in a cloud computing cluster.

8. The electronic computing device of claim 1, wherein the electronic processor is further configured to:
transmit at least part of the context information to a communication device of another user;
receive information from the communication device of another user; and
store the received information in the memory as part of the context information.

9. A method for determining an action to be executed in response to a user query as a function of pre-query context information, the method comprising:
receiving audio data from a microphone of an electronic computing device prior to receiving the user query;
storing the audio data in a circular buffer;
determining, with the electronic computing device, at predetermined time intervals as a function of a size of the circular buffer, context information from the audio data;
storing, with the electronic computing device, the context information in a memory;
categorizing, with the electronic computing device, the context information as public safety incident context information based on a public safety incident during which the context information was determined;
receiving second audio data from the microphone;
determining, with the electronic computing device, that the second audio data corresponds to the user query;
determining, with the electronic computing device, that the user query relates to the public safety incident;
determining, with the electronic computing device, at least one of a query intent and query slot information using the public safety incident context information corresponding to the public safety incident;
determining, with the electronic computing device, the action to be executed as a function of the second audio data and the context information; and
executing, with the electronic computing device, the action in response to the user query.

10. The method of claim 9, further comprising:
executing, with the electronic computing device, the action in accordance with the query intent and the query slot information.

11. The method of claim 9, further comprising:
generating, with the electronic computing device, query results in response to the user query; and
prioritizing, with the electronic computing device, the query results as a function of the context information.

12. The method of claim 9, further comprising:
performing, with the electronic computing device, text transcription of the audio data to generate text corresponding to the audio data;
storing, with the electronic computing device, the text corresponding to the audio data in the memory; and
performing, with the electronic computing device, natural language processing on the text to determine the context information.

13. The method of claim 9, further comprising:
categorizing, with the electronic computing device, the context information based on at least one of the group consisting of an incident type, a location, a time of day, and a name of a person involved in a communication;
determining, with the electronic computing device, a category of information of the at least one of the query intent and the query slot information of the user query; and
determining, with the electronic computing device, the at least one of the query intent and the query slot information using the context information, the context information corresponding to the determined category of information.

14. The method of claim 9, wherein executing the action in response to the user query includes at least one of the group consisting of:
providing a query result with an output device of a communication device of a user;
transmitting, via a transceiver, information to a second communication device of a second user; and
storing information in the memory.

15. The method of claim 9, wherein storing the context information in the memory includes storing the context information in the memory, the memory being located on at least one of a portable communication device and a back-end device in a cloud computing cluster.

16. The method of claim 9, further comprising:
transmitting, with the electronic computing device via a transceiver, at least part of the context information to a communication device of another user;
receiving, with the electronic computing device via the transceiver, information from the communication device of another user; and
storing, with the electronic computing device, the received information in the memory as part of the context information.

17. The method of claim 9, wherein storing the context information in the memory includes storing the context information in a second circular buffer, and wherein receiving the second audio data includes receiving the second audio data after determining the context information from the audio data, and further comprising:
overwriting, with the electronic computing device, less recent context information in the second circular buffer with more recent context information when the second circular buffer is full.

18. The electronic computing device of claim 1, wherein the electronic processor is further configured to:
    store the context information in a second circular buffer; and
    overwrite less recent context information in the second circular buffer with more recent context information when the second circular buffer is full.

\* \* \* \* \*